United States Patent [19]

Brueggemann

[11] Patent Number: 4,595,947

[45] Date of Patent: Jun. 17, 1986

[54] LIGHT COLLECTION BY ELLIPTICAL CYLINDER MIRRORS FOR RASTER INPUT SCANNERS

[75] Inventor: Harry P. Brueggemann, San Marino, Calif.

[73] Assignee: Xerox Corporation, Stamford, Conn.

[21] Appl. No.: 544,893

[22] Filed: Oct. 24, 1983

[51] Int. Cl.$^4$ .................. H04N 1/46; H04N 1/04; G02B 26/08; G02B 5/08
[52] U.S. Cl. ........................... 358/75; 358/294; 350/6.1; 350/618; 350/625
[58] Field of Search .................. 358/75, 78, 80, 285, 358/293, 294; 355/51, 66, 8, 43, 45, 49, 57, 60, 65, 67, 67 S, 68; 350/6.1, 6.5, 6.6, 6.7, 6.8, 6.2, 6.3, 6.4, 6.9, 6.91, 600, 612, 613, 614, 616, 618, 625, 628, 629, 630; 250/216; 313/524; 362/346, 347

[56] References Cited

U.S. PATENT DOCUMENTS

| 1,897,219 | 2/1933 | Schröter | 358/294 |
| 3,469,030 | 9/1969 | Priebe | 350/6.8 |
| 3,674,974 | 7/1972 | Costello | 350/618 |
| 4,247,160 | 1/1981 | Brueggemann | 350/6.8 |
| 4,396,834 | 8/1983 | Appel et al. | 362/346 |

FOREIGN PATENT DOCUMENTS

| 2535144 | 2/1976 | Fed. Rep. of Germany | 355/8 |
| 210362 | 12/1982 | Japan | 355/8 |

OTHER PUBLICATIONS

Martin, L. C., Technical Optics, Sir Isaac Pitman & Sons, Ltd., London, 1948, pp. 24-26.
Wolfe, W. L. (editor), Handbook of Military Infrared Technology, Office of Naval Research, Department of the Navy, Washington, D.C., 1965, p. 434.
Smith, W. J., Modern Optical Engineering, McGraw Hill, 1966, New York, p. 80.

Primary Examiner—James J. Groody
Assistant Examiner—Randall S. Svihla
Attorney, Agent, or Firm—Franklyn C. Weiss

[57] ABSTRACT

A elliptical cylinder mirror system for use in a raster input scanning system which allows for high efficiency light gathering and reflection to a photosensitive device. Elliptical cylinder mirrors 10, 12 are placed adjacent to a scan line 14 on a document or other medium 8 to be scanned. The input light 38 is caused to raster scan the medium wherein the light reflected from the medium is now modulated by the information on the medium 8. One elliptical cylinder mirror 10 collects and focusses the reflected light from one side of the scan line directly onto a photosensitive or similar type of device 18. Another elliptical cylinder mirror 12 collects and reflects the light from the other side of the scan line towards a fold mirror 20 which, in turn, reflects the light toward the same or closely situated photodetector 18. A large proportion of the light reflected by the medium 8 is gathered by the mirrors 10, 12 for use in the photodetection process.

10 Claims, 1 Drawing Figure

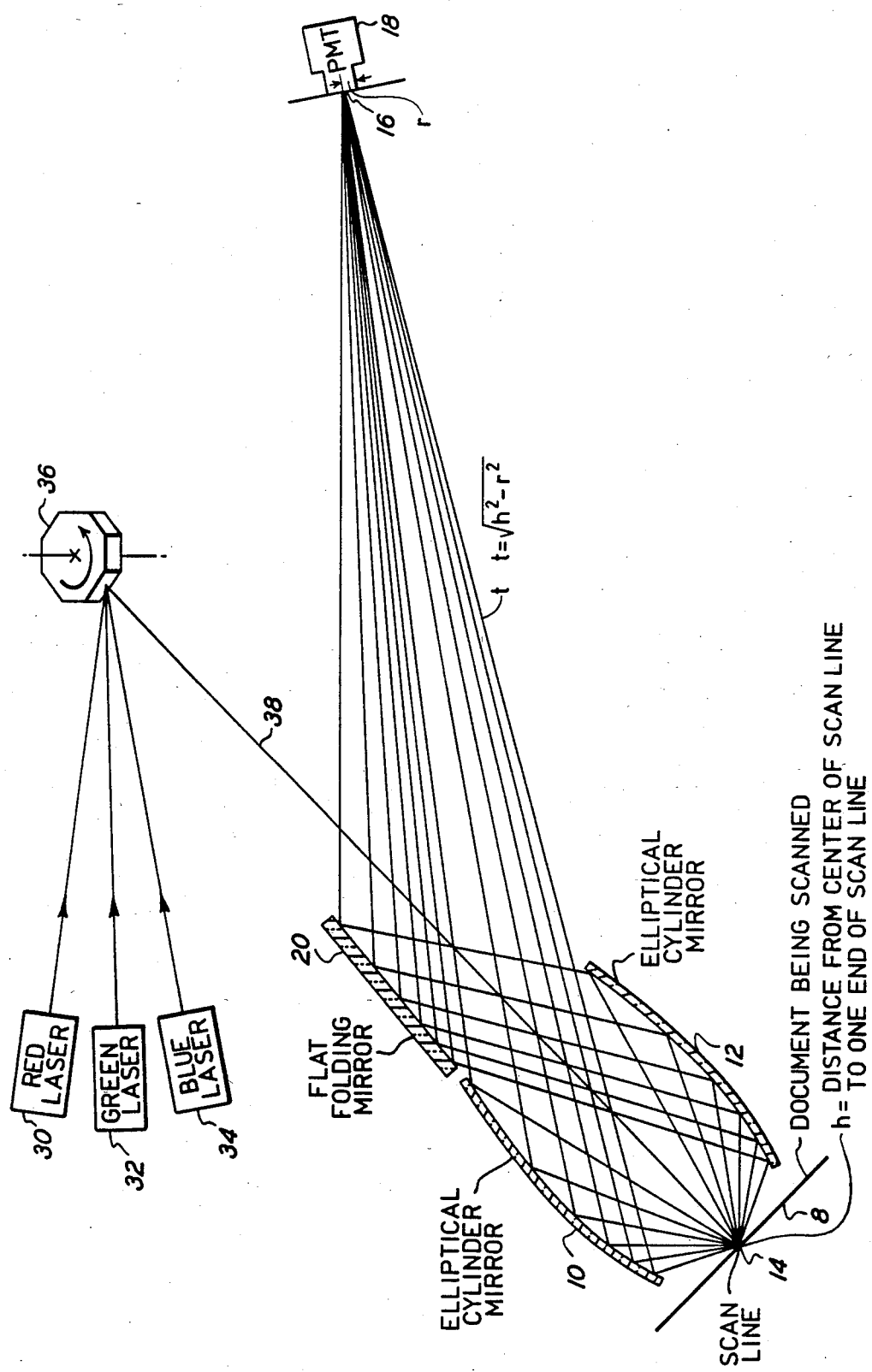

LIGHT COLLECTION BY ELLIPTICAL CYLINDER MIRRORS FOR RASTER INPUT SCANNERS

This invention relates to the use of conicoidal mirrors adjacent a scanned line in a raster input scanner to collect the reflected light for further reflection to a light detector. A scanning laser beam is directed to a document or other medium to be scanned, with the reflected light therefrom, indicative of information on the medium, be mostly collected by the conicoidal mirrors, said mirrors collecting and focussing the light onto a photodetector or other type of light to electric converter.

BACKGROUND OF THE INVENTION

A raster input scanner (RIS) consists of a mechanism which sweeps a spot of light across the face of a document or other medium to be sampled. The sweep is repetitive, and the document is moved in a direction perpendicular to the sweep, so that eventually the spot of light has sampled the entire document. Light is reflected from the document, or not reflected, depending on whether the light spot is sampling a white, black, or colored portion of the document. For black-and-white sampling the light spot can be monochromatic, and for color document sampling the light spot must contain at least three colors, nominally red, green, and blue.

The mechanism which sweeps the spot across the document is only part of the equipment needed for obtaining a video record of the document. Another part is the light collection system, which collects the light reflected from the document, and concentrates it on a photosensitive device, such as a photo-multiplier tube.

The collection system must collect only the diffusely reflected light, and must reject the specularly reflected light. Specularly reflected light can be reflected from a black, colored, or white portion of the document, and thus is not part of the desired signal.

The collection system must be efficient, gathering as much of the desired signal light as possible, or too much power is required of the scanning spot. There is a theoretical limit, imposed by the optical invariant, to the fraction of light reflected from the document which can be collected. The collection system efficiently should approach this limit.

One prior art RIS collector used as "light pipe" to collect diffusely reflected light from the scanning spot. This was a solid block of plastic, one inch thick and as long as the scan line on the document. It was 13 inches deep, with the length tapering down with depth, so that at the end, the length was enough to accommodate three photomultiplier tubes (PMT's) side by side. Each PMT responded to one color, red, green, or blue, depending on the filter that was placed immediately ahead of the PMT. The PMT's were cemented onto the light pipe, but slots were cut into the light pipe ahead of each PMT to accommodate the filters, so the PMT's were not "immersed".

The light pipe was bulky, and could not be folded to fit into a restricted space. There is desirable signal light along either side of the scan line, separated by the undesirable specularly reflected light. Only one side could be collected, because only one light pipe could be located at the PMT's, the bulkiness prevented another light pipe from being used. Thus half the desirable signal was lost.

A second approach was to use two cylinder lenses parallel to the scan line, one on each side. By using folding mirrors, light collected from both sides of the scan line could be directed to the PMT's, thus doubling the collection efficiency. But the cylinder lenses had sagittal field curvature, as described in U.S. Pat. No. 4,247,160, by the equation:

$$C_s = (1 + 1/n)(1 - H)^2 / f_s$$

where $C_s$ is the saggital field curvature, $f_s$ is the focal length in the power direction of the cylinder, n is the index of refraction of the material of the cylinder, and H is the ratio of two distances. For a RIS application, this ratio can be defined as the distance of the cylinder lens from the PMT, divided by the distance of the scan line from the PMT. Field curvature prevented the half-angle subtended by the scan line, at the PMT, from being greater than about 22°. The half-angle is defined as extending from the center of the scan line to one edge of the scan line. From the center to the other edge of the scan line is the other half-angle.

The invariant now says that the half-angle subtended by the scan line should be about 45° for maximum efficiency. Thus, a single cylinder lens on each side of the scan line could not operate at maximum efficiency.

Two cylinder lenses on each side of the scan line were tried. One cylinder was located near the scan line, as in the previous approach, and the other was located near the PMT, to minimize field curvature. This allowed a scan line half-angle of 45°, but now the PMT lens from one side of the scan line interfered with the PMT lens from the other side of the scan. A large angle was needed between the beams from each side of the scan. This caused problems in bringing the beams together at the PMT's, they had to be folded by mirrors and the arrangement was mechanically bulky.

According to the present invention, conicoidal mirrors are placed adjacent to a scan line on a document or other medium to be scanned. The input light is caused to raster scan the medium wherein the light reflected from the medium is now modulated by the information on the medium. One conicoidal mirror collects and focusses the reflected light directly onto a photosensitive or similar type of device. Another conicoidal mirror collects and reflects the light towards a fold mirror which, in turn, reflects the light toward the same or closely situated photodetector. A large portion, therefore, of the light reflected by the medium is gathered by the mirrors for use in the photodetection process.

DESCRIPTION OF THE DRAWINGS

For a more complete understanding of the invention, reference may be had to the following detailed description of the invention in conjunction with the drawings wherein the FIGURE is a representative schematic view of the conicoidal lens system in a raster input scanner.

DETAILED DESCRIPTION OF THE INVENTION

It is known that cylinder mirrors have no sagittal field curvature (see U.S. Pat. No. 4,247,160 column 3 lines 19 and 20). Use of cylinder mirrors then eliminates the major problem associated with cylinder lenses as light collectors, and the PMT's can be located at the optimum position according to the optical invariant.

The optical invariant for a RIS light collector is: $h \sin \alpha_s = r \sin \alpha_p$, wherein h is the length of the scan from the center of the scan to one end of the scan, r is the radius (semi-diameter) of the photo-sensitive face of the PMT, $\alpha_s$ is the angle subtended by r at the center of the scan line, and $\alpha_p$ is the maximum angle from the normal to the face of the PMT over which the PMT can collect light reflected from the document. If the value of r is small compared to its distance from the center of the scan, then it can be said that $\sin \alpha_s = \alpha_s$. The value of $\alpha_s$ is r/t, where t is the distance between the PMT and the center of the scan line. In this invention, there are no optics in the plane of the scan, so that the PMT can see 90° from the normal, then $\sin \alpha_p$ is unity. Using this values for the angles in the equation above, it is seen that the r's cancel and that t=h. That is, for maximum light collection from the ends of the scan, the half-angle subtended by the scan line at the PMT should be 45°.

This same result can be obtained geometrically. One could assume that specular reflections are rejected, and that the diffusely reflected light collected by the PMT is Lambertian. Light intensity per unit solid angle is proportional to the cosine of the angle of the light to the normal of the document, for Lambertian scattering. One would then find the angle ($\beta_s$) subtended by the radius of the PMT at the end of the scan line. This angle is not $\alpha_s$, because $\alpha_s$ is the angle subtended by the radius at the center of the scan line. When the distance t is very large, the value of $\beta_s$ will be small. As the PMT is brought closer to the center of the scan line by reducing t, the value of $\beta_s$ will increase. But since the PMT is moving towards the center of the scan line, the face of the PMT will be tilted at a greater angle to the end of the scan line. As the PMT is brought up to the center of the scan line so that t is zero, the angle subtended by the face of the PMT at the end of the scan will be zero. Obviously, there is some optimum value of the distance t, which provides the maximum amount of energy collected from the end of scan by the PMT. This optimum distance is found by writing the expression for $\beta_s$ in terms of r, h, and t, multiplying it by the Lambertian attenuation factor, differentiating it with respect to t, and equating to zero. If the value of r is small compared to the value of h, the result is the same as obtained by the invariant, t=h for maximum light collection at the end of scan.

If r is large, so that $\sin \alpha_s$ is not equal to $\alpha_s$, the optimum value of t is somewhat less than h. The algebra is much simpler if the optical invariant is used instead of a geometrical approach. The optical invariant yields $$t = \sqrt{h^2 - r^2}$$

For a given scan length, the optimum distance t is determined, and the parameters of the cylinder mirrors are established.

The present invention consists of two cylinder mirrors 10, 12 which are parallel to the scan line 14. The cylinder section is an arc of an ellipse, not of a circle. The foci of this elliptical cylinder are two lines, parallel to the surface of the mirror. One of these focus lines is coincident with the scan line 14, and the other line 16 crosses the photocathode of the PMT 18. All paths from the center of the scan line to the PMT are the same length, when the path includes one reflection from the mirror. The optimum distance t is measured from the center of the scan line 14 to the PMT 18 along one of these paths.

The two mirrors 10, 12 are on opposite sides of the scan line 14, and they intercept the diffusely reflected light from the scan line. The specular component is avoided by keeping the edge of the mirror nearest the scanning beam at some minimum angular distance away from the scanning beam, the value of which depends on the reflectance characteristics of the paper and inks used on the documents or other media to be scanned. Typical values are 15 or 20 degrees; energy within the intervals from the scanning beam being allowed to escape. The energy at very large angles from the scanning beam is very low because of the Lambertian falloff, and it is not worth collecting so the other edge of the mirror stops at some angular distance from the document, typically 20 or 25 degrees.

The PMT 18 can be located at a focus line 16 of one of the cylinder mirrors 10, when the other focus line is at the scan line. The other mirror 12 must have one focus line at the scan line, and with the angular restrictions on the positions of the edges of the mirrors, the other focus line of the second mirror cannot in general be located at the PMT.

A folding mirror 20 must be used in the path of the rays from the second mirror 12, to redirect these rays to the PMT 18. This means that the path length for the second mirror 12, from the scan line to the PMT, is greater than for the first mirror 10. If it is required that the focus lines for both mirrors fall on the PMT, the mirrors must be two different designs. However, for light collection, it is not necessary for a sharp image to fall on the PMT, and in fact not desirable, since variations in quantum efficiency over the surface of the photo cathode would cause signal fluctuations if the image of the line wandered over the face of the PMT 18. The energy line could wander because of wrinkles in the document, which move the scan line off of the focus line, or by vibrations in the system which cause relative motion between the scan line and the PMT. Also, slight deviations of the path length away from the optimum value of t, do not cause a noticeable loss of efficiency. Then identical mirrors could be used, the path length of one, from the scan line to the PMT, could be slight less than optimum, and of the other slightly more than optimum.

A typical scan line 14 in the FIGURE is 25 inches long and normal to the plane of the paper in the drawing, it intersects the paper in the lower left corner. The scanning beam for color output consists of three laser beams coincident and synchronous with each other, each beam a different color: red 30, green 32, and blue 34. The beam 38 is swept along the scan line via rotating polygon 36, and the three color light is reflected from the document 8. Polygon 36 and lasers 30, 32, 34 are shown in a representative configuration only as the rotational axis of polygon 36 would actually be in the plane of the paper for beam 38 to be only a line in the FIGURE. Thus, the polygon in this view would be seen on edge. The lasers could impinge on the polygon by the use of special light transmitting dichroic mirrors to allow for proper optical alignment of the beams. Rays are shown radiating from the scan line 14 at various angles from the scanning beam 38. Rays within 15 degrees of the scanning beam are not collected, since they have a large specular component. Rays are shown from 15 to 65 degrees from the scanning beam in 10 degree steps, on both sides of the scanning beam. These rays originate at the first focus line 14 of two identical elliptical cylinder mirrors, and are reflected by the mirrors toward their respective second focus lines. Rays from mirror 10 reach the PMT 18 before they reach the second focus line, so they are out of focus at the PMT. Rays from mirror 12 strike a flat folding mirror 20, which reflects them toward the PMT. Their paths to the PMT are ⅛ inch longer than the ray paths of the mirror on the left, so they reach the focus line before they reach the PMT. By the time they reach the PMT they are also out of focus, by the same amount as the rays from the left mirror.

There are three PMT's side by side, one with a red transmitting filter, one with a green, and one with a blue filter. One of the PMT's is in the plane of the paper, another is above the paper, and the third is below. They are approximately at the optimum distance t from the scan line as dictated by the optical invariant. Therefore each PMT receives as much light from each end of the scan line as the invariant allows. The optical focusing consists only of the two cylinder mirrors 10, 12 with power in the plane of the paper, there is no power (no focusing action) normal to the plane of the paper. The meaning of the invariant is this: A PMT of a given diameter and at the position dictated by the optical invariant, cannot receive any more light from the end points of the scan line no matter what optical focusing power is arranged in the plane normal to the paper.

The mirrors are shown in the FIGURE to be much closer to the scan line 14 than they are to the PMT's; causing a relatively small mirror width in the plane of the mirror. The collection angles are fixed relative to the scanning beam, so if the mirrors are moved further from the scan line, their width increases. If the mirrors are too close to the scan line, their alignment becomes critical, and difficult to accomplish. There is an optimum location for the mirrors, depending on the space limitations and alignment requirements, for each application.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. A raster input scanner for collecting the light reflected from a document or other medium repetitively scanned by a moving beam of light along a scan line, the improvement comprising:

two elliptical cylinder mirror means positioned parallel to and adjacent said scan line, the first of said two elliptical cylinder mirror means being positioned to collect certain of the light reflected from said document or other medium and to reflect said collected light to a focus line positioned away from said first mirror means, the second of said two elliptical cylinder mirror means being positioned to collect certain of the remaining light reflected from said document or other medium and to reflect said collected light to essentially the same focus line as for said first elliptical cylinder mirror means.

2. The raster input scanner as set forth in claim 1 further including a flat fold mirror adjacent to and parallel with said first elliptical cylinder mirror means and in the path of said reflected light from said second elliptical cylinder mirror means to reflect said collected light to said focus line.

3. The raster input scanner as set forth in claim 2 further including photosensitive means at said focus line to convert the reflected light into electrical signals.

4. A raster input scanner for collecting the light reflected from a document or other medium repetitively scanned by a moving beam of light along a scan line, the improvement comprising:

two elliptical cylinder mirror means positioned parallel to and adjacent said scan line, one of said two elliptical cylinder mirror means being positioned to collect some of the light reflected from said document or other medium and to reflect said collected light to a focus line positioned away from said first mirror means, the other of said two elliptical cylinder mirror means being positioned to collect some of the remaining light reflected from said document or other medium and to reflect said collected light to substantially the same focus line as for said first mentioned elliptical cylinder mirror means, and photosensitive means at said focus line to convert the reflected light into electrical signals.

5. The raster input scanner as set forth in claim 4 further including a flat fold mirror adjacent to and parallel with said first mentioned elliptical cylinder mirror means and in the path of said reflected light from said second mentioned elliptical cylinder mirror means to reflect said collected light to said focus line.

6. The raster input scanner as set forth in claim 3 wherein said moving beam of light comprises a red, green, and blue source of light and said photosensitive means comprises red, green, and blue light-to-electrical conversion means.

7. The raster input scanner as set forth in any one of the preceding claims wherein the surface of each said elliptical cylinder mirror means is an arc of an ellipse with one focus of said ellipse being said scan line and the other focus being said focus line.

8. The raster input scanner as set forth in claim 3 wherein the surfaces of each said elliptical cylinder mirror means are the same arc of an ellipse with one focus of each elliptical cylinder mirror means being said scan line and the other focus being at substantially said focus line.

9. The raster input scanner as set forth in claim 3 wherein the surfaces of each said elliptical cylinder mirror means are arcs of different ellipses with one focus of each said elliptical cylinder mirror means being said scan line and the other focus being said focus line.

10. The raster input scanner as set forth in claim 3 wherein the distance t from the center of the scan line via either one of said two elliptical cylinder mirror means to said photosensitive means is determined by the relationship $$t = \sqrt{h^2 - r^2}$$

where h is the length of the scan line from the center of the scan line to one end of the scan line, and r is the radius of said photosensitive means.

* * * * *